Aug. 17, 1954 M. DEN HERTOG 2,686,839

GROUP SELECTION CONTROL CIRCUIT

Filed June 20, 1950

2 Sheets-Sheet 1

Inventor

MARTINUS DEN HERTOG

By Robert Harding Jr.

Attorney

Aug. 17, 1954

M. DEN HERTOG 2,686,839

GROUP SELECTION CONTROL CIRCUIT

Filed June 20, 1950

2 Sheets-Sheet 2

INVENTOR.
MARTINUS DEN HERTOG
BY Robert Harding Jr.
ATTORNEYS.

Patented Aug. 17, 1954 2,686,839

UNITED STATES PATENT OFFICE 2,686,839

GROUP SELECTION CONTROL CIRCUIT

Martinus den Hertog, Antwerp, Belgium, assignor to International Standard Electric Corporation, New York, N. Y., a corporation of Delaware Application June 20, 1950, Serial No. 169,273

Claims priority, application France June 21, 1949

10 Claims. (Cl. 179—18)

This invention relates to an electrical testing device particularly suitable for use in telecommunication systems.

The object of the invention is to provide means for giving greater flexibility to such devices.

In my U. S. Patent 2,561,051 a selection control circuit is disclosed using static electrical means for scanning numerical groups of circuits, testing the electrical condition of the circuits so scanned, and selecting one circuit in a particular group. A feature of this invention is the provision of a system by means of which arbitrarily chosen groups of telephone lines which are already numerically grouped may be marked in such a manner that a free line in a particular one of the arbitrarily chosen groups may be selected regardless of its position with respect to the numerical grouping.

Another feature of the invention comprises the automatic busying of both the selecting apparatus and an associated register when a particular line has been selected.

Another feature of the invention consists in using certain characteristic test factors for making the selection of the desired line, such test factors being electrical conditions which follow each other in a predetermined cycle of time positions, there being $m \times n$ time positions in a recurring time cycle.

Another feature of the invention consists of an automatic telecommunication system comprising a selector with a control equipment, devices being provided to hunt among the outlets of said selector from any position, and the test devices being such that the control means completely identify each outlet tested whatever the position among the outlets from which hunting began.

Various other features will appear from the following description, given as a non-limitative example, with reference to the attached drawings in which.

Figure 1:
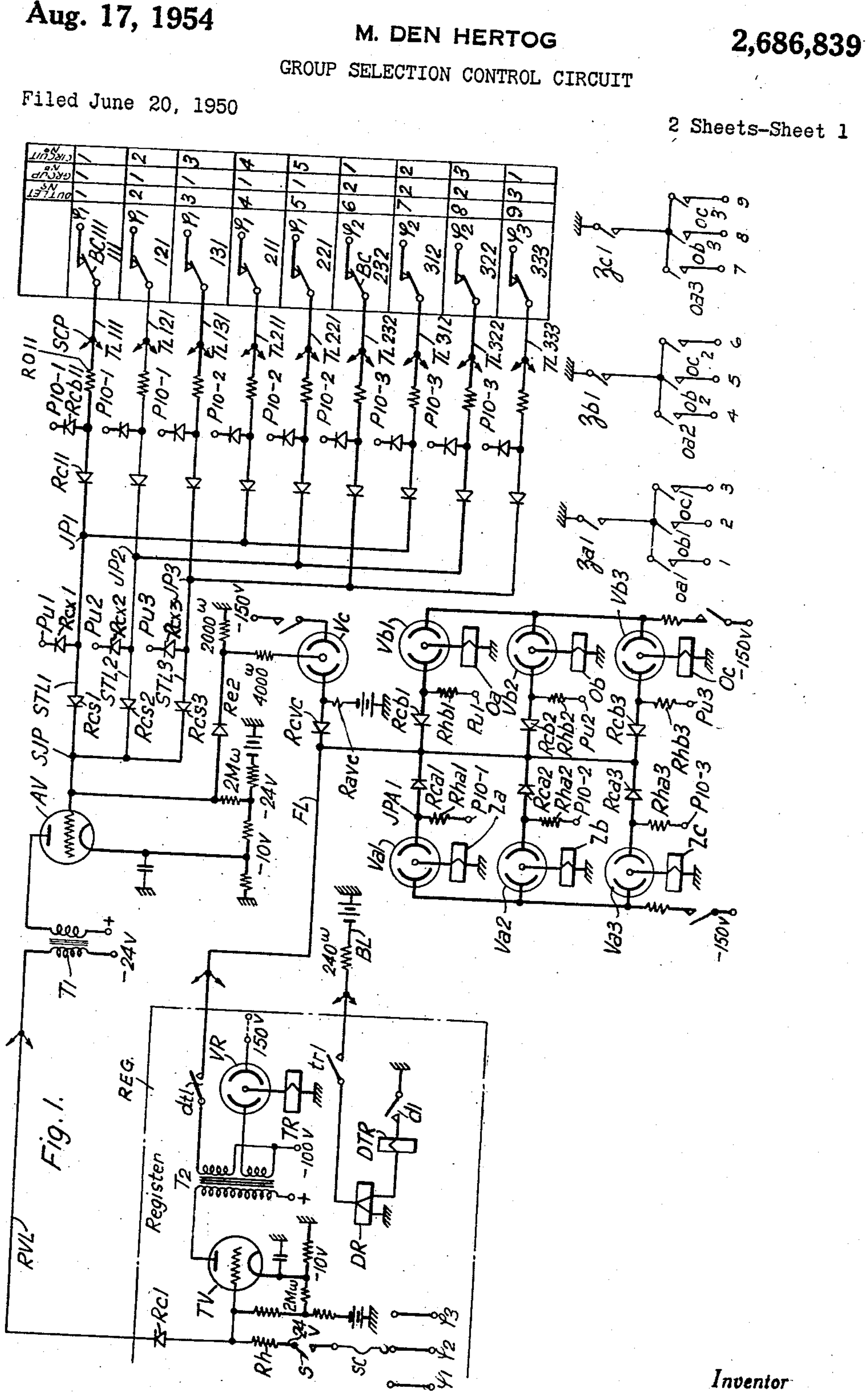
Fig. 1 shows the circuit elements of a register-controller, a group selector and a control circuit for the group-selector, sufficient to understand the invention.

Only those elements necessary for an understanding of the invention have been shown for each of the lines to be tested, namely the test lead, the busying contact therein, and a marking connection thereto. These elements have been shown in the large rectangles at the right of Fig. 1 which are labeled 111, 121, 131, 211, 221, 232, 312, 322, and 333 to correspond to test leads TL111, TL121, TL131, TL211, TL221, TL232, TL312, TL322, and TL333. Each lead includes a busy contact, e. g. BC111 for lead 111 and BC232 for lead 232, which is opened when the line is busy and closed when it is free. Each lead also ends in a terminal to which is applied a train of pulses, in a manner to be later described, for marking the line for identification purposes.

The line or outlet number is shown in the next small rectangle towards the right of the large rectangle. Thus, the test leads shown are those of lines or outlets 1 to 9 inclusive.

The test leads are connected via resistances, such as Ro11 for lead TL111, and rectifiers such as Rc11 for that lead, to junction points JP1, JP2, and JP3. In the example shown there are nine outlets, multipled in three sets of three at points JP1, 2, 3, the first outlets of each set being multipled together, and so on. Between the individual resistance, e. g. Ro11, and the individual rectifier, e. g. Rc11, each test lead is connected via a rectifier, e. g. Rcb11, to a source of potential pulse trains, e. g. P10–1, P10–2, P10–3, which will be described below. Source P10–1 is connected to the first set of test leads, TL111, 121, 131, source P10–2 is connected to the second set of test leads, TL211, 221, 232, and so on.

The lines of the three groups mentioned are arbitrarily divided into additional groups for a different classification, three of these groups being indicated. The terminals of each additional arbitrary group are marked with a different pulse train, the pulse trains being indicated as $\phi 1$, $\phi 2$, $\phi 3$. Thus the terminals of leads 111, 121, 131, 211, and 221 are marked with pulse train $\phi 1$ and have been labeled $\phi 1$; terminals of leads 232, 312 and 322 are marked with pulse train $\phi 2$ and have been labeled $\phi 2$; while the terminal of lead 333 is marked with pulse train $\phi 3$ and has been so indicated.

The leads STL1, 2, 3 from junction points JP1, 2, 3 are connected via individual rectifiers Rcs1, 2, 3 to a further junction point SJP which is in turn connected to the grid of a thermionic valve AV. Sources of potential pulse trains Pu1, 2, 3, to be described later, are connected respectively to leads STL1, 2, 3 between JP1, 2, 3 and Rcs1, 2, 3, over rectifiers Rcx1, 2, 3, respectively.

The anode of valve AV is connected via a transformer T1 to a conductor RVL which is connected to a register REG. A common point in the conductor is multipled to other registers. Lead RVL is connected via a rectifier Rc1 in the register REG, to the grid of another thermionic valve TV. The anode of valve TV is connected to the primary winding of a transformer T2 having two parallel secondary windings, one connected to the control electrode of a cold cathode tube VR in the register, while the other is connected via a lead FL, on the one hand, to the control electrode of a cold cathode glow-discharge tube VC of the selector circuit and, on the other hand, to the control electrodes of a set of cold cathode glow discharge tubes Va1–3, Vb1–3 also placed in the selector circuit.

A relay TR is inserted in the anode circuit of the tube VR. Relay TR through its contact tr1 controls a circuit from a relay DR in the register in order to terminate in a battery in the selector circuit via the contact tr1, conductor BL and a resistance.

The grid of valve TV in the register controller is also connected via a resistance Rh and a switch S to a selector contact or wiper sc capable of being set on to one of the sources of potential pulse trains φ1, 2, 3, which form the characteristic test factors.

As has already been pointed out, groups of test leads, such as TL111, accessible from the selector are connected respectively to potential sources φ1, 2, 3, via a back contact, such as BC111. In the example shown a first arbitrarily chosen group of five test leads are connected to φ1, a second group of three test leads to φ2, and the only test lead of the third group to φ3. The setting of contact wiper sc in the register controller determines the group of outlets from the selector which are to be tested, as described later.

Lead FL is connected to the control electrode of tube VC via a rectifier Rcvc, said control electrode also being connected via a resistance Ravc to the battery. The tubes Va1–3, Vb1–3, are arranged in two groups of three valves and their control electrodes are connected via rectifiers Rca1–3, Rcb1–3, to the lead FL. The control electrodes of tubes Va1–3 are also connected respectively via resistances Rha1–3 to the potential sources P10–1, P10–2, P10–3, while the control electrodes of the valves Vb1–3 are also connected respectively via the resistances Rhb1–3 to the potential pulse train sources Pu1, 2, 3. As has been indicated, the sets of Pu potential sources are respectively connected to conductors STL1–3 and the sets of P10 potentials are respectively connected to TL111—131, 211—232, 312, 322, 333. The relays La–Lc, Oa–Oc comprising a certain number of make contacts are respectively inserted in the anode circuits of tubes Va1–3, Vb1–3. If a relay of the Va group is operated, it indicates the selection of a particular group of lines, for instance, 1 to 3, 4 to 6, 7 to 9. The relay operated in the Vb group indicates a particular line in the group. Thus, these relays control a combination of contacts identifying the particular outlet selected.

The cathodes of tubes VC, Va1—Va3, and

Vb1—Vb3 are connected to negative battery through respective contacts which close (in a manner not shown) when the selector is seized and which when opened after the circuit has been set up will restore the tubes to a deionized condition, ready for another selective operation. The cathode circuits for tubes Va1—Va3 and Vb1—Vb3 each includes a common resistance which provides a drop in potential when one tube of a group operates, sufficient to prevent other tubes of that group from operating but not sufficient to extinguish the tube which has operated.

It will be seen that three sets of potential sources φ, Pu, P10 are used for controlling two stages of numerical selection. This allows the outlets to be divided up in any desired arbitrary manner into one, two, or three groups. The outlets are divided up in specific groups, each having an equal number of outlets for identification purposes, and the potential sources Pu, P10 are used for this identification, while the sources φ are used for distributing the outlets in arbitrary fashion among a certain number of groups up to and including three.

It will be appreciated that three times three circuits have been used for simple illustration purposes. In practice larger groups and a larger numbers of groups are likely to be used, ten groups of ten outlets each being the usual arrangement in automatic telephone exchanges.

Several selector circuits may have access to the same group of outlets as indicated by the commoning arrows SCP.

Figure 3:
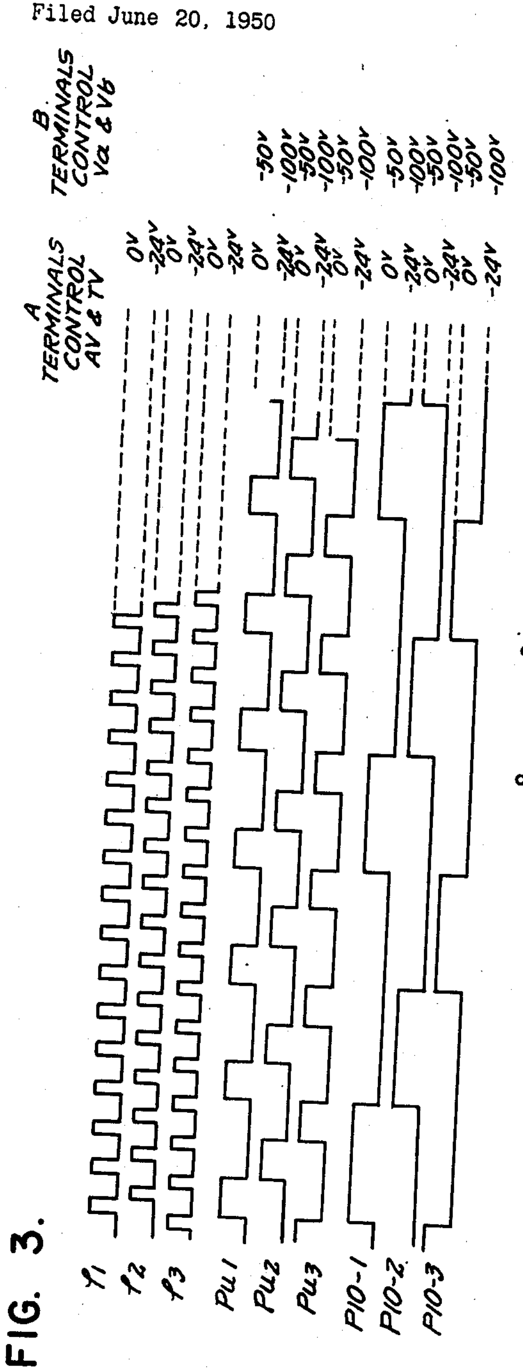
Fig. 3 shows the relation of the various time impulses to each other.
Figure 2:
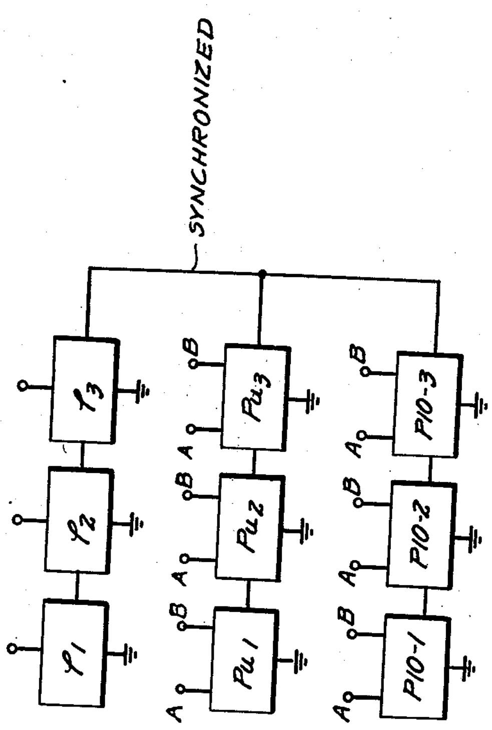
Fig. 2 shows the sources of time impulses used in controlling the selection in the device of Fig. 1.

Fig. 2 indicates the sources of pulse trains and Fig. 3 the nature of the pulse trains which are of three different orders φ, Pu, P10. Each source supplies a constant potential for the larger part of its time cycle, which is replaced once per cycle by a different potential constituting a pulse. All the sources of the same order produce pulses having different time positions in the same time cycle and together constitute a recurring cycle of time pulses equal in number to the required maximum number of groups or outlets in a group.

The φ sources are used only for biassing the grids of valves AV and TV; for this purpose the steady potential and that of the potential of the pulse have been respectively fixed at —24 v. and 0 volts.

The cycle of the φ pulse trains is the shortest of the three different orders.

A suitable time interval between pulses may be 200 microseconds when the pulses do not have to operate the same cold cathode tube successively. This corresponds to 5,000 impulses per second. The impulse period of each of the sources is variable depending upon the total number of the different sources. With 10 sources, each source would provide a pulse once every 2 milliseconds (500 per second). With 20 sources each source would provide a pulse once every 4 milliseconds (250 per second). The rate of 5,000 pulses per second referred to above may be increased when using thyratrons, because this type of tube is about 10 times faster, so that the rate may reach 50,000 per second.

The three pulse cycles φ, Pu, P10 have a predetermined relation. Each pulse in the cycle Pu is in synchronism with and of equal duration to that of a complete cycle of pulses of the φ cycle. Thus if there are three φ pulse trains producing together three pulses per φ cycle, one pulse in the Pu cycle will embrace those three φ pulses;

if there are ten pulses per cycle, each Pu pulse will have the same duration as these ten pulses.

Each pulse in the P10 cycle is in synchronism with and of the same duration as a complete cycle of Pu pulses.

The pulses supplied by the sources Pu and P10 are used to control both the thermionic valve AV and the cold cathode glow-discharge tubes Va1–3, Vb1–3. Consequently, different values are used for cycles P10 and Pu according to whether tube AV or tubes Va, Vb, Vc are concerned, i. e. —24 v. for the constant potential and 0 v. for the impulses for tube AV and —100 v. for the constant potential and —50 v. for the impulses for cold cathode tubes. The pulse train sources Pu1–3 and P10–1–3 have therefore each been shown with two terminals A and B; the former serving to bias tubes AV and TV and the latter the groups of tubes Va and Vb.

When a —150 v. potential is applied to the cathode of one of the tubes Va Vb, a potential of —100 v. applied to the control electrode of said tube is an ineffective control potential, i. e. not causing its ionization; a —50 v. potential on the other hand, applied to said control electrode is an effective control potential, i. e. causing the ionization of the tube.

The system will further be described with reference to the case in which a hundred outlets have been provided. Consequently it will be assumed that there will be 10 groups of ten outlets whenever three groups only are shown in the drawing. It will be seen that all of the hundred outlets are connected through a system of rectifiers and resistances to the grid of one common amplifying valve AV. The system of resistances and rectifiers has the purpose of connecting each of the hundred outlets in a hundred successive periods to the amplifying valve AV, so that only in the period corresponding to a particular outlet may the source of current connected at this outlet become effective at the grid of the valve. The length of the period assigned to each outlet corresponds to the cycle of impulses from the sources φ1, 2, etc., so that during the time a particular outlet may have effect upon the grid of the valve AV, the corresponding φ potential impulse may be fed through the system of resistances and rectifiers to the grid. Assuming, for example, that there are ten different sources φ, then the interval between two successive impulses provided by any one of these sources will be nine times that of one impulse, or in other words the length of one cycle of these sources equals ten times the length of an impulse. It is obvious that under these conditions the successive impulses from φ sources follow one another uninterruptedly. Each outlet is to be allocated a complete φ cycle for connection to the amplifying valve AV. It will be evident that each individual outlet is connected to the valve AV for one impulse in every hundred of corresponding source φ. The total time for a complete cycle during which all of the one hundred outlets may be connected to the valve AV is equal to a hundred cycles φ or a thousand times the length of one impulse.

For the purpose of permitting each of the individual outlets to connect the source of current allocated thereto to the grid of valve AV, a system of rectifiers controlled by two different types of current sources is provided. The sources of control of the first type have been designated by Pu1, 2, . . . and the duration of each pulse of these is ten times the duration of each pulse of the sources φ, in such a manner that one pulse provided by Pu covers all the impulses of a cycle φ. Ten sources Pu have been provided. The second kind of source referred to is indicated by P10–1, 2 . . .; and the duration of a pulse of these sources is ten times as long as that of a pulse of sources Pu.

Considering, for example, outlet 1, it will be seen that a source φ1 is connected thereto and this source is controlled by rectifiers which are connected to sources P10–1 and Pu1 respectively. Assuming that there are ten sources such as P10–1 and that the order in which they provide their impulse is by their suffix, then it will be clear that the outlet 1 applies an impulse during a time unit which may be identified by the combination 111, the first two figures indicating a particular time unit in a hundred time units in which the corresponding outlet can act on the amplifying valve, the last digit indicating the particular source φ connected to this outlet. The first digit indicates the source P10 and the second digit the source Pu. Similarly, it will be seen that the outlet 2 is identified by the combination 121. The outlet 3 is identified by the combination 131 and so on. Each of these combinations has been indicated in the drawing in a rectangle (large rectangle at left) corresponding to each outlet, and it will be seen that a different combination is obtained for each of the outlets, said combination corresponding to one of the thousand time units into which a complete P10 cycle can be divided.

The combination of the two cycles of time P10, Pu corresponds to one hundred time periods in which the different sources φ may send a pulse. If there is only one group of outlets, the same φ pulse could be used in each of the hundred time units; if the number of groups of outlets is between 1 and 10, or any number of groups of outlets up to ten, a corresponding number of φ pulses from among 1–10 will be used. The distribution of the hundred outlets among the groups is quite arbitrary, depending on the number of φ pulses which is used in each period.

It will now be assumed that the register has to select a free outlet in the second group, and that at the moment in which the operation begins, we are exactly at the beginning of a cycle of one thousand time units.

It is clear from what has been said before that an impulse to the grid of valve AV will be supplied from all outlets that are free, that is to say those in which the busy contacts e. g. BC111 are closed, for example in the time unit 111 from outlet 1, and in time unit 121 from outlet 2 etc. All free circuits provide an impulse in different time units to the grid of valve AV, and the valve retransmits these impulses via a step down transformer T1 to a common wire RVL which terminates in the register. The impulses received in the register act on the grid of the valve TV, via a rectifier Rc1. The grid of valve TV is connected via a resistance Rh, a switch S, and a selector or contact wiper sc to one of the φ sources of potential, which indicates the group of outlets to be selected; the contact sc in the example shown has been assumed to be connected to source φ2. The potentials applied by this source are such that the valve is only able to function during the periods of peak or impulses, but when this impulse occurs at a moment that no impulse is generated in the secondary windings of transformer T1, a potential of —24 v. is applied to the grid through rectifier Rc1, via the winding T1 and so the impulse supplied from the source $\varphi 2$ will be absorbed in resistance $Rh$, and valve TV remains blocked. If the impulse supplied by the source $\varphi 2$ coincides with that from the transformer T1, then the potential at the grid of the valve TV is modified so that the valve TV operates. This is the case when the impulses supplied from the outlet coincides in time with that of the source connected to the register. It will be seen that this will only occur for the outlets connected to sources $\varphi 2$, or in other words, those of the second group. This may happen in one of the time units 232, 312, or 322. During the first of these time units, the impulse transmitted by transformer T causes valve TV to function; a difference of potential is produced on the terminals of the secondary windings of transformer T2. This transformer fulfills two functions:

In the first place, through its lower secondary winding, it acts on the cold cathode tube VR. This tube is ionized and causes the operation of a relay TR thereby indicating that a free outlet of the desired group has been found. A contact *tr1* associated with relay TR is inserted in a double test circuit which will now be described.

The double test feature referred to above involves the operation of relay DR under control of contact *tr1*. The circuit of DR is from ground in the control circuit, through battery and line BL, a resistance of 240 ohms, a common point to which a plurality of registers are connected, contact *tr1*, high resistance winding of DR, to ground. Upon the operation of DR, contact *d1* closes a circuit through relay DTR in series with a low resistance winding of the relay DR, thus operating relay DTR and holding the relay DR operated, and, because of increased current in the circuit of line BL, the voltage on the common connection drops sufficiently to prevent the operation of relays DTR in other registers which may be attempting to operate under control of the pulses received from transformer T1.

The second purpose of transformer T2 is to supply through its upper secondary winding and contact *dt1* of relay DTR an impulse to another wire FL which terminates on the control circuit of the selector and is connected thereat to the system of cold cathode tubes V*a* and V*b*. The wire FL is also connected through a rectifier RCVC to a tube V*c* the purpose of which will be later described. It will be noted that unless relay DTR operates and its contact *dt1* closes no impulse can reach the tube V*c* or the system of tubes V*a* and V*b*. This system of cold cathode tubes is controlled by the pulse trains from two sets of sources P*u* and P10. Assuming that outlet 6 has been found free in time unit 232; an impulse is then supplied to the set of tubes V*a* and V*b* in the time unit in which the sources P10–2 and P*u*3 both provide an impulse. Accordingly valves V*a*2 and V*b*3 are ionized and by their combination indicate in a manner to be described the outlet which is to be selected.

The different cold cathode tubes of each group are connected to different sources of potential which supply impulses positioned in time and which are indicated on the drawing by P*u*1 to P*u*3 and P10–1 to P10–3 respectively. The three tubes of each of the groups will be activated in different time units, depending on the movement the impulses are received. In the example shown, in order that the tube V*a*1 will operate it is necessary for the source of current P10–1 to apply −50 v. potential at the same time that the wire FL also connects −50 v. This is because when −100 v. is connected from FL and the P10–1 source sends an impulse of −50 v., the said source is positive with respect to the FL source and current will flow through the rectifier R*ca*1 and there will be a potential drop of 50 v. across the only resistance R*ha*1, so that the potential of the point JPA1 is at −100 v.

The pulse sources are applied to the control electrodes via the corresponding resistances R*ha*1–3, R*hb*1–3 which have a high resistance compared with the internal resistance of each impulse source connected to wire FL; even if the rectifiers were absent on the different shunts starting from the wire FL to terminate on the control electrodes, said wire FL would remain practically at the potential of −50 v. which is applied to it; −100 v. potential applied to one of the control electrodes could not influence the −50 v. potential on another control electrode, via the common wire FL.

The rectifiers R*ca*1–3, R*cb*–3 have the effect of preventing the −50 v. effective potential on wire FL from being received on the control electrodes of the tubes which moreover receive −100 v. via one of the resistances R*ha* or R*hb*. In such a case the potential of the wire FL is higher than that applied via resistance R*ha*, R*hb*, and consequently the rectifier is not conductive and the potential on the control electrode will be maintained at −100 v. which cannot cause the tube to ionize. If the rectifiers were absent, all control electrodes would be brought to the same potential of wire FL and all tubes would fire simultaneously.

The method of operation is as follows. Considering one of the tubes, e. g. V*a*1, it will be seen that a potential of −100 v. is connected to its control electrode via its resistance e. g. R*ha*1 except in the time unit when the source P10 allocated thereto is transmitting a −50 v. potential pulse.

If however a −50 v. pulse is applied to its control electrode, via the resistance R*ha*1, and a potential of −100 v. is applied via wire FL, then current will flow via rectifier R*ca*1 and resistance R*ha*1 and wire FL; the potential on the control electrodes will still be −100 v. so that the tube will not fire. It will be seen therefore that only that tube in each group will fire which has −50 v. connected via resistance, e. g. R*ha* or R*hb* associated therewith and at the same time via wire FL. The firing of two tubes characterizes a particular signal out of one hundred possibilities given by the combination of 10 P10 sources and 10 P*u* sources. Thus twenty tubes, six of which are shown, are employed to differentiate a hundred signals.

As has been indicated, the tube groups provided are of equal size and the number of signals which have been received is a multiple of the number of tubes contained in each of these groups. It is obvious that the method of procedure has only been given as an example of the factors into which the number of signals or selections to be handled could be split up. If these different factors are designated by $m$, $n$, $o$ . . . we have $m \times n \times o$ possible signals.

Combinations of contacts associated with the relays Z*a*—Z*c* and O*a*—O*c* inserted in the anodes of the tubes are provided to close circuits individual to each signal which can be received. Thus, contact *za1* is connected in series with a parallel arrangement of contacts *oa1*, *ob1*, and *oc1* respectively to three wires labeled 1, 2, and 3; contact *zb1* is connected in series with a parallel arrangement of contacts $oa2$, $ob2$, $oc2$ respectively to three wires labeled 4, 5, and 6; and contact $zc1$ is connected in series with a parallel arrangement of contacts $oa3$, $ob3$, and $oc3$ respectively to three wires labeled 7, 8, and 9. When the relays $Za$ and $Ob$ operate, for instance, earth is applied to wire 2 to indicate that the received signal represents outlet 2.

Earth applied to any of these wires 1–9, shown at the lower right hand corner of Figure 1, will cause the selection of the corresponding outlet in a manner not shown.

It will now be assumed that the outlet 6 is busy. Contact BC232 associated with said circuit is then open isolating source $\phi 2$, so that in time unit 232 no impulse will be supplied by transformer T1 and valve TV will not become effective during this time unit. If outlet 7 is available, if contact BC312 is closed, a pulse will be supplied at time unit 312, the valves $Va3$ and $Vb1$ will operate and connect earth to wire 7 and the said outlet 7 will be selected. It will, therefore, be seen that irrespective of the manner in which the outlets are divided over the different groups, the system of tubes $Va$ and $Vb$ will operate in a time unit assigned to the selected circuits. The distribution of the selected circuits is done on a decimal basis and a decimal system of tubes is able to give the required selection; the number of these tubes does not vary with the manner in which these outlets are used with the different groups.

In the embodiment described above one hundred selector outlets have been considered and to each of these are allocated ten successive time positions. One of the ten allocated time positions is marked by a potential pulse to identify the group to which this outlet belongs. Two other potential pulses of different lengths mark the tens and units digits corresponding to this circuit and their coincidence provides means to characterize the circuit concerned. Considering the hundred outlets, the coincidences of their respective tens and units pulses occur successively throughout a thousand time position cycle, each coincidence being of ten time positions duration. The pulse coincidences are arranged to block successively rectifiers in the circuit between selector and register-controller so that at the latter a test circuit can scan the electrical condition of all the outlets. Search is made by the register controller for an outlet belonging to a particular group. When the required group pulse marking is received the indication corresponding to the outlets among which hunting is effected is given by ten successive time positions, and is immediately sent to the selector, the tubes of the selector receive this indication and effect the busying of the first free outlet. In terms of the detailed description above, the group pulse markings are obtained from the source $\phi 1 \ldots \phi 10$, each of which can produce pulses at corresponding time positions for all the outlets. The two other digit identification pulses are those from the $Pu$ and P10 sources, each of which there are ten. Coincidence of a particular pair of $Pu$ and P10 pulses opens and causes the rectifiers associated with a circuit terminating in the register-controller to send back the characteristic which identifies the outlet.

It is essential to understand that the hundred outlets may be grouped in any desired manner. All the hundred outlets may be marked by pulses in corresponding time positions, say the 1st, 11th, 21st . . . 991st, so that they all belong to the same group. Alternatively two outlets might be included in a first group, three in a second and the remainder in a third, in which case the group marking pulses could be at the 1st, 11th, 22nd, 32nd and 42nd, 53rd, 63rd . . . and 993rd time positions. With a thousand time positions and a hundred outlets, up to ten groups may be used, but the selection of the group to which an outlet may belong is not restricted in any other way. There may be any number of groups between one and ten and the number of outlets per group may vary widely. A high degree of flexibility may therefore be obtained, it being possible to group outlets in a wide variety of arrangements. Hence although a thousand time positions are required for a hundred outlets instead of a hundred time positions as in systems based on simpler principles, this step is not retrogressive but provides unexpected and substantial advantages in flexibility and increased facility for outlet identification.

It has already been emphasized that the division of a hundred outlets into ten groups is intended only as an example. There is no necessity to number the outlets according to the decimal system and generally speaking $n$ outlets may be considered individually or divided up into sets in any suitable manner. The example quoted has ten sets of ten outlets but these could equally well have been arranged as five sets of twenty circuits or four sets of twenty-five circuits. The particular manner of dividing up the $n$ outlets into sets may be chosen for example because it provided the better use of equipment. To each of the $n$ outlets, however divided up, there are allocated $m$ test factors and these as described are corresponding cycles of ten time positions, a pulse source, such as $\phi 1$, emitting one impulse in each time position. If a certain number of these test factors is made to correspond to several outlets, then a well-defined group of outlets is formed with the $n$ outlets. Referring back to the second example quoted in the last paragraph where three groups of outlets contained respectively two, three and ninety-five circuits, this result could be obtained by having $m=3$ test factors $\phi 1$, $\phi 2$, and $\phi 3$ and applying $\phi 1$ to two outlets, $\phi 2$ to three outlets and $\phi 3$ to ninety-five outlets. However with $m=10$ as previously described up to ten groups are obtainable and generally speaking there may be any number of groups between one and $m$.

Comparing the selector-register-controller circuit as described for a particular application with the general statements regarding $n$ outlets each having $m$ electrical conditions, it will be clear that as a hundred outlets and ten test factors require a thousand time units so in the general case an $m \times n$ time position cycle is necessary. In each time unit as before one impulse path is opened between the selector and the register. Whereas ten groups of outlets could be obtained, the corresponding number is now $m$. Each group is associated with $n$ time units and all these $n$ time units have a corresponding relation to repetitive cycles of $m$ time units. For the register-controller to select an outlet belonging to a particular group its test circuit is supplied with pulses from a source (like $\phi 1$) which provides those pulses distinguishing time units in repetitive cycles of $m$ time positions, characterizing the different groups. When the path opens to the test circuit from a selector outlet supplying a particular pulse and the test circuit supplies a like pulse, the test device operates. This device only responds to a pulse in the same time unit and is not affected by the pulses sent by outlets belonging to other groups.

In the above description it has been explained that all the free circuits send a pulse in different time units to the grid of tube AV, said tube retransmitting this pulse via common wire RVL to the register-controller in which the tube TV only operates if this pulse coincides with one of the pulses sent via wiper SC. When this happens a pulse is transmitted, as explained, to tubes V*a* and V*b* via wire FL, said tubes being ionized in accordance with a certain combination according to the identity of the circuit from which the pulse comes. At the same moment the pulse sent via wire FL also causes the ionization of tube VC via a rectifier R*cvc*; since this tube is not connected to any pulse source, it will be ionized whatever the time unit in which the pulse can be transmitted in a wire FL.

The operation of tube VC will now be explained. As soon as VC is ionized, current flows in the discharge space between its anode and cathode from a point of —150 v. potential through two resistances of 4000 and 2000 ohms; consequently the potential of the junction point of these two resistances passes from earth to about —25 v. This potential is then transmitted via rectifier R*c*2 to the grid of tube AV, which is thus maintained henceforth at a potential of —25 v. even if the other circuits were transmitting a pulse to said grid; this —25 v. potential blocks the tube AV in this way and the transmission of pulses via the tube AV, the transformer T1, and the wire RVL, to the register controller terminates immediately from the time unit in which this register controller has responded to a pulse from one of the outlets in the desired group. These arrangements have been made so that the other outlets of the desired group cannot repeat this operation which might cause the ionization of other tubes of the groups V*a* and V*b*; there would then be confusion, since there is only a single tube which must be ionized in each group in order to indicate a particular selected outlet.

I claim:

1. A telecommunication system comprising a plurality of lines arranged in groups, each line having a terminal, means for marking the terminal of each line according to its group and its position in said group, means for additionally marking the terminals in accordance with groups of lines chosen arbitrarily regardless of the position of said lines in the previously mentioned groups, a selecting circuit connected to said terminals, means for setting said selecting circuit in accordance with the marking of any arbitrarily chosen group of the lines in which it is desired to select a line, and means in said selecting circuit under control of said setting means for causing said selecting circuit to indicate a free line in the desired group.

2. A telecommunication system, according to claim 1, in which means is provided for removing the additional marking from a terminal when the associated line is busy.

3. A telecommunication system, according to claim 1, in which each of the several marking means comprises sources of voltage pulse trains divided into groups, the pulses of each pulse train from one group having the same recurrence rate but having different time positions with respect to the pulses of the other pulse trains of that group, and the pulse trains of each group having a predetermined time relation with respect to those of the other groups.

4. A telecommunication system, according to claim 3, in which the selecting circuit comprises a plurality of coincidence devices, and means for making each device responsive to a different combination of pulse trains applied thereto and in which the indicating means is responsive to the combination of said devices operated.

5. A telecommunication system, according to claim 4, in which the selecting circuit is connected to the line terminals over a single circuit, a register connected in said circuit and including the means for setting the selecting circuit, said setting means comprising means to connect to the register a pulse train source producing the same pulse train which is connected to the particular arbitrarily chosen group of lines in which it is desired to select a free line, and means for causing the register to initiate the response of said selector only when a pulse coincides with a pulse transmitted over said single circuit.

6. A telecommunication system, according to claim 5, further comprising means responsive to the operation of one of said coincidence devices for preventing further pulses from reaching the register over the single circuit.

7. A telecommunication system comprising a plurality of terminals in a circuit network arranged in a succession of grouping stages and having an increasing number of terminals in successive stages, with each terminal connected by a portion of the circuit network to a group of terminals in a succeeding stage, a first rectifier included in the circuit network adjacent each terminal and poled to permit current to flow from a terminal of the last stage in the direction of said first stage, a resistance connected to said first stage terminal, a plurality of sources of pulse trains having a common connection, means for connecting the other end of said resistance to said common connection, the pulses of each of said pulse trains having less time duration than the time displacement between pulses and the repetition rate and time position of the pulses in each train having a predetermined relation to the repetition rates and time positions of the pulses of the other trains, a second rectifier connected to each terminal except that of said first stage and poled to permit current to flow through said rectifier away from the associated terminal, means for connecting a pulse train source to each second rectifier to identify the group of terminals in the next stage connected to the associated terminal, means for connecting selected ones of said pulse train sources respectively to arbitrarily chosen groups of the terminals of the last stage, a coincidence circuit having two inputs one of which is connected to said terminal in said first stage, and means for selectively connecting the other of said inputs to one of said pulse train sources of those connected to said arbitrarily chosen groups of last stage terminals, whereby said coincidence circuit will respond when a pulse is received from said first stage terminal simultaneously with one on the other of said inputs.

8. A telecommunication system, according to claim 7, further comprising a plurality of registering means each being responsive to the operation of said coincidence circuit at a predetermined time in the time position cycle of said pulse trains, and means controlled by the operation of said registering means for producing an indication of the registering means operated.

9. A telecommunication system, according to claim 8, further comprising means for preventing the transmission of pulses from the first stage terminal to the coincidence circuit after two pulses have been simultaneously received on the input circuits of said coincidence circuit.

10. A telecommunication system, according to claim 9, in which there are a plurality of coincidence circuits with the first input of each multipled to the first stage terminal, further comprising means in each coincidence circuit controlled by the operation thereof for preventing another coincidence circuit from being effective in response to the same coincidence of pulses.

References Cited in the file of this patent

UNITED STATES PATENTS

| Number | Name | Date |
|---|---|---|
| 2,553,605 | Ransom | May 22, 1951 |
| 2,561,051 | Den Hertog | July 17, 1951 |
| 2,583,711 | Scowen | Jan. 29, 1952 |
| 2,619,548 | Lesti | Nov. 25, 1952 |